(12) United States Patent
Michaud

(10) Patent No.: US 9,738,203 B2
(45) Date of Patent: Aug. 22, 2017

(54) FOLDABLE EXTENSION DECK AND RAMP ASSEMBLY FOR PICKUP TRUCK

(71) Applicant: Michel Michaud, Campbellton (CA)

(72) Inventor: Michel Michaud, Campbellton (CA)

( * ) Notice: Subject to any disclaimer, the term of this patent is extended or adjusted under 35 U.S.C. 154(b) by 316 days.

(21) Appl. No.: 13/987,646

(22) Filed: Aug. 19, 2013

(65) Prior Publication Data

US 2014/0064895 A1    Mar. 6, 2014

Related U.S. Application Data

(60) Provisional application No. 61/743,159, filed on Aug. 28, 2012.

(51) Int. Cl.
*B60P 1/43* (2006.01)
*B62D 33/08* (2006.01)

(52) U.S. Cl.
CPC ............... *B60P 1/435* (2013.01); *B60P 1/431* (2013.01); *B62D 33/08* (2013.01)

(58) Field of Classification Search
CPC .. B60P 1/435; B60P 1/431; B60P 3/40; B60P 1/43; B62D 33/08; A47B 1/08; A47B 1/10
USPC .......... 296/26.09, 26.1, 61; 414/537
See application file for complete search history.

(56) References Cited

U.S. PATENT DOCUMENTS

| | | | |
|---|---|---|---|
| 2,766,959 A * | 10/1956 | Duncan | A47B 1/10 108/83 |
| 4,573,731 A | 3/1986 | Knaack et al. | |
| 4,601,632 A | 7/1986 | Agee | |
| 4,624,619 A | 11/1986 | Uher | |
| 4,685,857 A | 8/1987 | Goeser et al. | |
| 4,722,109 A * | 2/1988 | Mountz | B60P 1/431 14/71.1 |
| 4,733,898 A | 3/1988 | Williams | |
| 4,900,217 A * | 2/1990 | Nelson | B60P 1/431 14/71.1 |
| 4,990,049 A | 2/1991 | Hargrove | |
| 5,257,894 A | 11/1993 | Grant | |
| 5,312,149 A * | 5/1994 | Boone | B62D 33/0273 296/61 |
| 5,393,192 A | 2/1995 | Hall | |
| 5,468,114 A | 11/1995 | Hickerson | |
| 5,533,771 A | 7/1996 | Taylor et al. | |
| 5,570,989 A | 11/1996 | Belanger | |

(Continued)

FOREIGN PATENT DOCUMENTS

CA    1033313    6/1978
CA    1284564    6/1991

(Continued)

*Primary Examiner* — Kaitlin Joerger
(74) *Attorney, Agent, or Firm* — Mario Theriault

(57) ABSTRACT

The foldable truck bed extension deck and ramp assembly are mountable in a short-box pickup truck. The bed extension deck and ramp assembly have a comparable length to a full-size pickup truck box when deployed for use, and are jointly foldable to fit into a short-bed pickup truck with its tailgate closed when not used. The bed extension deck has a strong upper surface to resist deformation in rough use. The ramp member can be deployed with its front end matching the surface of the extension deck so that a vehicle can be driven along the ramp member and onto the deck surface without encountering any transition step.

4 Claims, 5 Drawing Sheets

(56) References Cited

U.S. PATENT DOCUMENTS

| | | | |
|---|---|---|---|
| 5,795,125 A * | 8/1998 | Walkden | B60P 1/431 14/71.1 |
| 5,863,173 A | 1/1999 | Bremner | |
| 6,082,800 A * | 7/2000 | Schambre | B60P 3/40 296/106 |
| 6,120,075 A * | 9/2000 | Terry | B60P 1/003 224/403 |
| 6,464,274 B2 | 10/2002 | Mink et al. | |
| 6,484,344 B1 * | 11/2002 | Cooper | A61G 3/061 14/71.1 |
| 6,659,524 B1 * | 12/2003 | Carlson | B60P 1/003 296/26.09 |
| 6,764,123 B1 * | 7/2004 | Bilyard | B60P 1/435 296/61 |
| 6,860,536 B1 * | 3/2005 | Schimunek | B60P 1/003 296/26.09 |
| 6,866,316 B1 * | 3/2005 | Harder | B60R 11/00 248/300 |
| 6,880,194 B2 * | 4/2005 | O'Donnell | B60P 1/431 14/69.5 |
| 7,121,603 B2 * | 10/2006 | Stevenson | B60P 1/003 296/26.09 |
| 7,128,357 B1 | 10/2006 | Carroll | |
| 7,175,060 B1 * | 2/2007 | Carpenter | B60R 5/04 224/281 |
| 7,237,817 B2 * | 7/2007 | Kobylski | B60P 1/003 296/26.01 |
| 7,240,939 B2 * | 7/2007 | Vandekerkhof | B60P 3/40 296/26.09 |
| 7,338,104 B1 * | 3/2008 | Bejin | B60P 1/003 224/403 |
| 7,363,670 B2 * | 4/2008 | Mitchell | B65G 69/2811 14/71.1 |
| 7,401,833 B2 * | 7/2008 | Dryja | B62D 33/0273 296/61 |
| 7,416,234 B2 * | 8/2008 | Bequette | B60P 1/003 296/26.08 |
| 7,854,458 B2 * | 12/2010 | Hobrecht | B60J 7/141 296/183.1 |
| 7,914,060 B2 * | 3/2011 | Scribner | B60P 3/40 224/519 |
| 8,002,116 B1 * | 8/2011 | Cato | B07B 1/46 209/315 |
| 8,074,314 B2 * | 12/2011 | Lucht | B65G 69/30 14/69.5 |
| 8,075,239 B2 * | 12/2011 | Hanzel | B60P 1/003 296/26.1 |
| 8,328,263 B1 * | 12/2012 | Alexander | B60R 5/041 296/26.09 |
| 8,479,460 B1 * | 7/2013 | Meyer | E04B 5/10 52/177 |
| 8,844,996 B2 * | 9/2014 | Garchar | B62D 33/0273 296/26.09 |
| 2002/0005648 A1 * | 1/2002 | Carpenter | B60R 5/04 296/26.09 |
| 2002/0153736 A1 * | 10/2002 | Goodyear | B60R 5/04 296/26.01 |
| 2006/0284439 A1 | 12/2006 | Carroll | |
| 2007/0205632 A1 * | 9/2007 | Faulkiner | B60P 1/431 296/183.1 |
| 2007/0210599 A1 * | 9/2007 | Arnold | B60P 1/003 296/26.09 |
| 2007/0237614 A1 * | 10/2007 | Johnson | B60P 1/431 414/467 |
| 2007/0278813 A1 | 12/2007 | Keehle | |
| 2007/0284904 A1 * | 12/2007 | Carvalho | B60P 1/431 296/57.1 |
| 2008/0042464 A1 * | 2/2008 | Hutchins, Jr. | B60P 1/435 296/61 |
| 2010/0332085 A1 * | 12/2010 | Song | B60P 1/431 701/49 |
| 2011/0010872 A1 * | 1/2011 | Van Beek | B60P 1/431 14/71.1 |
| 2011/0260486 A1 * | 10/2011 | Thygesen | B62D 33/02 296/26.09 |
| 2012/0233787 A1 * | 9/2012 | Couto | A61G 3/061 14/71.1 |
| 2013/0028703 A1 * | 1/2013 | Popejoy | B62D 63/06 414/812 |
| 2013/0094931 A1 * | 4/2013 | Bluhm | B60P 1/431 414/523 |

FOREIGN PATENT DOCUMENTS

| | | |
|---|---|---|
| CA | 2065170 | 10/1992 |
| CA | 2076255 | 2/1994 |
| CA | 2292293 | 6/2002 |
| CA | 2755410 | 4/2013 |
| CA | 2756208 | 4/2013 |

* cited by examiner

FOLDABLE EXTENSION DECK AND RAMP ASSEMBLY FOR PICKUP TRUCK

The present application claims the benefit of U.S. Provisional Application No. 61/743,159, filed Aug. 28, 2012.

FIELD OF THE PRESENT INVENTION

The present invention pertains to the field of truck ramps stowed inside truck-bed liners, and more particularly, it pertains to foldable bed extension deck and ramp assemblies for use in short-box pickup trucks.

BACKGROUND OF THE PRESENT INVENTION

Modern pickup trucks have extended cabs capable of sitting five passengers comfortably. The boxes of these modern pickup trucks have a length of 6 ft.-6 in., basically. These short boxes cannot transport trail-type or mountain-type snowmobiles with lengths of 11 and 13 feet respectively, even with the tailgate in the open position. Similarly, lumber and other residential construction materials are sold in 8, 10 and 12 foot lengths. Transporting these materials in a short-box pickup truck can sometimes be a challenge. For these reasons, it is believed that modern short-box pickup trucks have created a market need for truck bed extension decks that can be used to transport material and equipment that is best transported in a conventional 8-foot truck box.

Conventional ramps for use with pickup trucks have a length of 8 feet. It is generally accepted that an 8-foot ramp provides an easy slope for loading a vehicle in the truck box. Short truck boxes are inherently associated with shorter ramps and a steeper climbing angle for loading sport or gardening equipment in the truck box. This inconvenience also points to a market need for truck bed extension decks that can be used to transport material and equipment that is best transported in a conventional 8-foot truck box.

In another aspect of truck bed liners, the most important factor in the design of a truck ramp and truck-bed liner or extension deck, is a weight-to-strength ratio of the deck itself. A truck owner does not want to carry extra weight in his truck and to spend unnecessary fuel. On the other hand, the buyer of a truck bed liner and ramp assembly wants this equipment to be strong, durable, usable and safe. In that point of view, a frame that is made of flat bars mounted on their edges offers the best weight-to-strength ratio, when compared to hollow structural tubing or structural angles of a same weight per foot for example. Despite this advantage, it is believed that a framing system made of flat bars in a truck bed liner has not been used in the past.

A number of truck-bed liners with and without ramps have been found in the prior art. It is believed that the following documents provide a good inventory of these previous inventions:

U.S. Pat. No. 4,573,731 issued to H. L. Knaack et al., on Mar. 4, 1986;
U.S. Pat. No. 4,601,632 issued to J. H. Agee on Jul. 22, 1986;
U.S. Pat. No. 4,624,619 issued to M. L. Uher on Nov. 25, 1986;
U.S. Pat. No. 4,685,857 issued to M. N. Goeser et al., on Aug. 11, 1987;
U.S. Pat. No. 4,722,109 issued to E. E. Mountz on Feb. 2, 1988;
U.S. Pat. No. 4,733,898 issued to S. D. Williams on Mar. 29, 1988;
U.S. Pat. No. 4,900,217 issued to J. N. Nelson on Feb. 13, 1990;
U.S. Pat. No. 4,990,049 issued to J. F. Hargrove on Feb. 5, 1991;
U.S. Pat. No. 5,257,894 issued to H. K. Grant on Nov. 2, 1993;
U.S. Pat. No. 5,393,192 issued to J. C. Hall et al., on Feb. 28, 1995;
U.S. Pat. No. 5,468,114 issued to S. J. Hickerson on Nov. 21, 1995;
U.S. Pat. No. 5,533,771 issued to S. Taylor et al., on Jul. 9, 1996;
U.S. Pat. No. 5,570,989 issued to M. Belanger on Nov. 5, 1996;
U.S. Pat. No. 5,795,125 issued to C. D. Walkden on Aug. 18, 1998;
U.S. Pat. No. 5,863,173 issued to R. A. Bremner on Jan. 26, 1999;
U.S. Pat. No. 6,464,274 issued to F. L. Mink et al., on Oct. 15, 2002;
U.S. Pat. No. 6,484,344 issued to S. M. Cooper on Nov. 26, 2002;
U.S. Pat. No. 7,128,357 issued to N. C. Carroll, on Oct. 31, 2006;
CA Patent 1,033,313 issued to J. L. Glassmeyer on Jun. 20, 1978;
CA Patent 1,284,564 issued to D. Manning et al., on Jun. 4, 1991;
CA Patent Appl. 2,076,255 published by G. O. Alexander on Feb. 18, 1994;

It is believed that a market need exists in the field of truck accessories for a foldable bed extension deck and ramp assembly having a good weight-to-strength ratio, and that can be mounted in a short-box pickup truck to provide the same advantages as those of a full size truck box, while preserving the integrity of the tailgate of the pickup truck.

SUMMARY OF THE PRESENT INVENTION

In the present invention, there is provided a foldable truck bed extension deck and ramp assembly that are mountable in a short-box pickup truck. The bed extension deck and ramp assembly according to the present invention have a comparable length to a full-size pickup truck box when deployed for use, and are jointly foldable for storage into a short-bed pickup truck with its tailgate closed.

The bed extension deck and ramp member assembly also have other features that are advantageous to pickup truck owners. The bed extension deck has a strong upper surface to resist deformation in rough use. The ramp member can be deployed with its front end matching the height of the surface of extension deck so that a vehicle can be driven along the ramp member and onto the deck surface without encountering any transition step.

More specifically, in a first aspect of the present invention, there is provided a truck bed extension deck and a ramp member that is telescopically mounted inside the bed extension deck. The bed extension deck has a channel on each side thereof. The ramp member has two sides, a front end and a dolly mounted on each side, near the front end. Each of the dollies has a pair of closely spaced casters mounted thereon. Each of these dollies are guided for movement along a lower flange of one of the channels inside the bed extension deck. Each dolly also has an arm extending backward from the pair of casters. Each arm is pivoted to a respective side of the ramp member at a distance from the front end of the ramp member.

Each channel has a guide block mounted to a web thereof at a distance from the lower flange at the rear end thereof. At the rear end of its travel, each dolly is movable to precisely fit between the guide block and the lower flange of the channel. In this position, each dolly is held firmly between the guide block and the lower flange of the channel when upward or downward forces are applied to the arms of the dolly.

Because the ramp member is pivoted to the arms of the dollies, at a distance from the front end thereof, the front end of the ramp member, in use, extends higher than the dollies to match the level of the floor surface on the bed extension deck. Equipment may be rolled onto the ramp member and deck surface without encountering a transition step at the rear edge of the bed extension deck.

In a second aspect of the present invention, there is provided a truck bed extension deck and a ramp member telescopically mounted inside the bed extension deck. The bed extension deck has a top plate; a channel on each side thereof and a structural frame system extending between the channels and the top plate.

The structural frame system comprises transverse flat bars extending across the channels and longitudinal flat bars extending across the transverse flat bars. The structural frame system also comprises angle joiners and fasteners retaining each end of one of the longitudinal flat bars to one of the transverse flat bars; and angle clips affixed exclusively to the longitudinal flat bars and the top plate for retaining the top plate to the structural frame.

The transverse flat bars are held against canting by the longitudinal flat bars. A deformation or sagging in the top plate is not transmitted to the transverse flat bars, and does not reduce the tensile strength of these transverse flat bars.

In a third aspect of the present invention, there is provided a truck bed extension deck having a ramp member telescopically mounted inside the bed extension deck. The bed extension deck has a front segment and a rear segment. The rear segment is joined to the front segment by a first hinge such that the rear segment is foldable upwardly relative to the front segment.

Similarly, the ramp member has a front portion and a rear portion. The rear portion is joined to the front portion by a second hinge such that the rear portion is foldable upwardly relative to the front portion.

The first hinge has an angle of articulation, and the second hinge is located within that angle of articulation when the ramp member is stowed flat inside the bed extension deck. Both the bed extension deck and the ramp member can be folded together with ease for storage into a short-bed pickup truck.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

The preferred embodiment of the bed extension deck and ramp assembly according to the present invention is described herein below with reference to the attached drawings.

Figure 1:
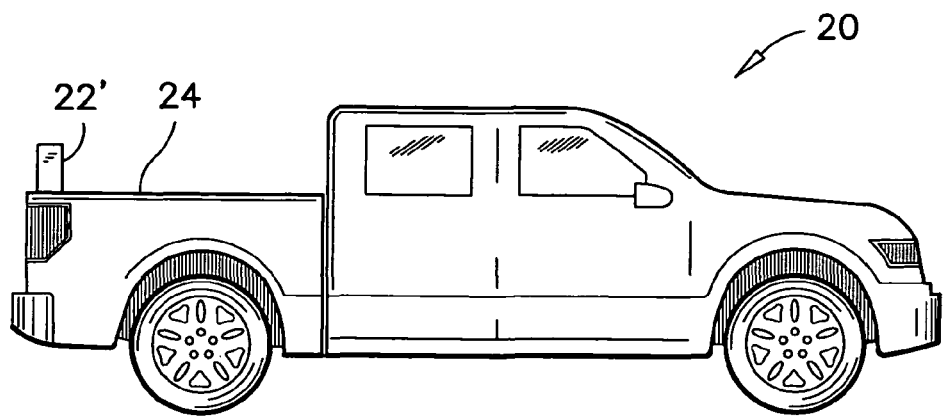
FIG. 1 is an elevation side view of a modern short-box pickup truck, with the preferred bed extension deck installed and stowed therein.

Referring firstly to FIG. 1, a modern short-box pickup truck 20 is illustrated therein as a reference, to better understand the foldable bed extension deck and ramp assembly according to the preferred embodiment of the present invention.

This short-box pickup truck 20 has the preferred bed extension deck mounted therein in a folded mode, such that the tailgate of the short-box truck can be closed. The foldable segment 22' of the bed extension deck is visible in FIG. 1. As it will be understood, the preferred bed extension deck has a length of slightly under 6 feet in a folded mode, and a total length of about 8 feet when extended over the tailgate of the truck in a deployed mode. For clarity, only the box portion 24 of that pickup truck 20 is illustrated in subsequent drawings included herein.

Figure 2:
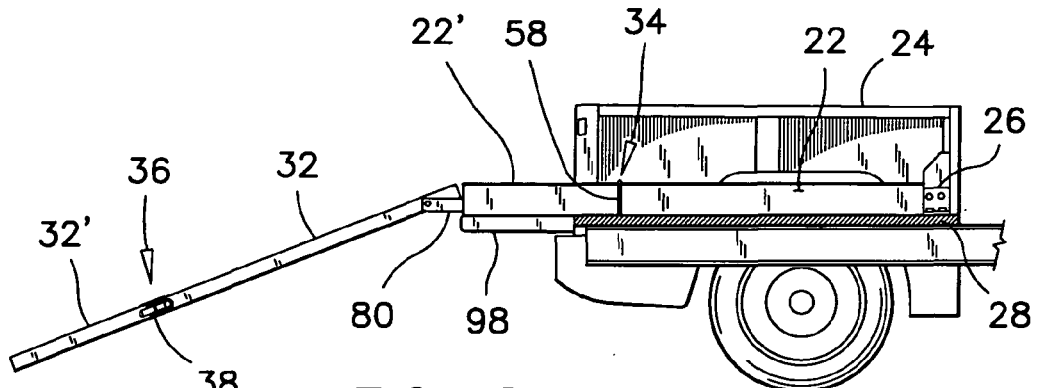
FIG. 2 is a cross-section side view of the short box of the pickup truck shown in FIG. 1, with the preferred bed extension deck and ramp assembly mounted in the truck box in a deployed mode.

Referring to FIG. 2, the bed extension deck 22 is preferably fastened to the floor of the box 24 of the pickup truck by brackets 26 bolted to the front end of the deck 22. The floor 28 of the truck box 22 is shown in cross-section shading in FIG. 2. Also in FIG. 2, it can be appreciated that the ramp member 32 is telescopically mountable into the bed extension deck 22. In this illustration, the ramp member 32 is shown in an extended, deployed mode. Although the box 24 is a short box, the ramp member 32 has a length of about 8 feet or more in a deployed mode.

As it will be better explained later, the bed extension deck 22 has a piano-type hinge 34 thereon retaining a foldable rear segment 22' to a fix front segment 22. Similarly, the ramp member 32 has a piano-type hinge 36 thereon retaining a foldable rear portion 32' to a front portion 32. The foldable rear segment 22' and portion 32' have a respective length of 2 feet or more.

Figure 3:
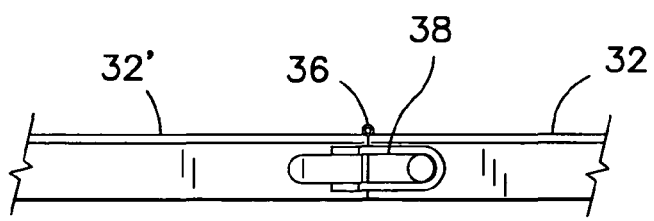
FIG. 3 is an enlarged side view of a segment along the ramp member in the preferred bed extension deck and ramp assembly, showing a latch along the ramp member.
Figure 4:
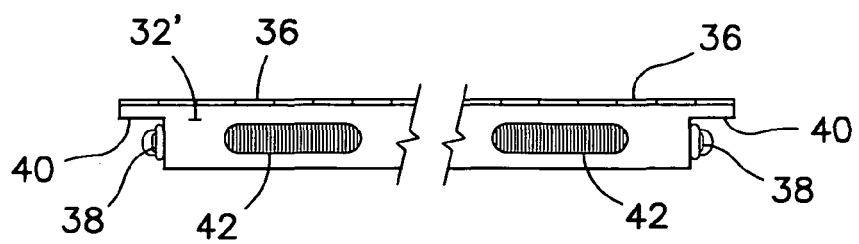
FIG. 4 is an end view of the ramp member.

In FIGS. 3 and 4, it can be seen that a pair of latches 38 are used to stiffen the ramp member 32 in use. The latches 38 are mounted to both portions 32' and 32 to prevent folding of these portions about the hinge 36 in use. The capacity of each latch 38 is preferably one ton or more.

The ramp member 32 has a shoulder 40 along both side edges thereof. These shoulders 40 are used for enclosing the latches 38 within the width of the ramp member and serve as guides for guiding the ramp member 32 inside the bed extension deck 22. The ramp member 32 also has a pair of handles 42, or handle-openings as illustrated, on its rear end to push and pull the ramp member 32 in and out from the bed extension deck 22 by hand.

Figure 5:
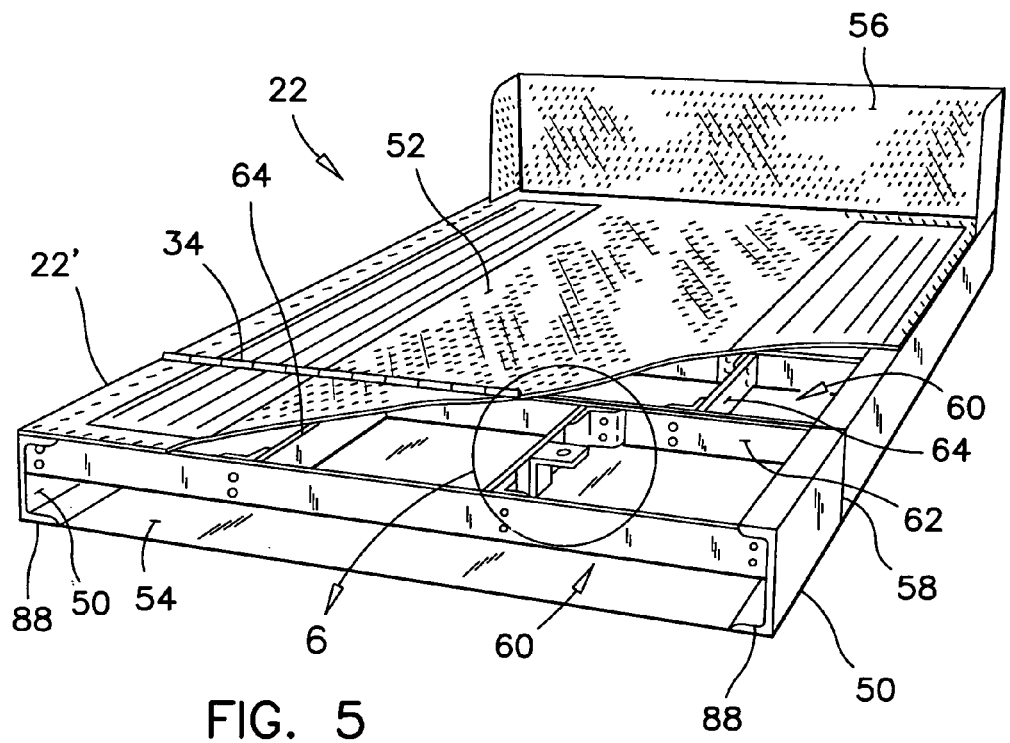
FIG. 5 is a perspective top and rear view of the preferred bed extension deck and a cut-away view through the cover plate of the preferred extension deck, showing the framing arrangement inside the extension deck.
Figure 6:
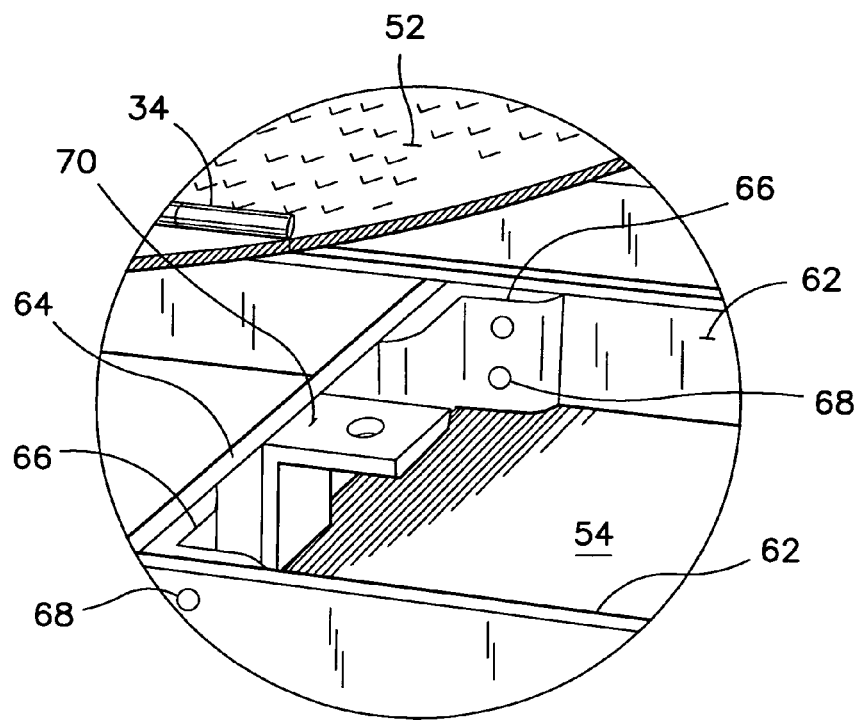
FIG. 6 is an enlarged side view of the framing arrangement inside the preferred extension deck, as seen in detail circle 6 in FIG. 5.

Referring now to FIGS. 5 and 6, the structural frame system of the bed extension deck 22 will be explained. The bed extension deck 22 has two structural channels 50 forming its sides; a first metal plate 52 on top, and optionally a second metal plate 54 closing the bottom of the bed extension deck. The preferred channels 50 are nominal 6 inch channels with 2 inch flanges.

A front vertical guard plate 56 is preferably provided along the front end of the deck 22 to protect the front end of the truck box against damage from equipment loaded on the deck 22. The foldable segment 22' of the extension deck 22 is separated from the front segment 22 along cut line 58. As it will be understood, the top and bottom plates 52, 54 and the structural frame system 60 are also separable at line 58.

Below the top plate 52, there is provided an array of flat bars mounted on edge and jointly forming the structural frame system 60 of the bed extension deck 22. The structural frame system 60 is made of transverse flat bars 62, which extend the full width of the bed extension deck 22, between the channels 50. These transverse flat bars 62 are spaced apart about 16 to 24 inches.

The transverse flat bars 62 provide substantially the entire structural strength of the bed extension deck 22 to prevent a transverse deflection of the deck 22. A series of longitudinal flat bars 64 are mounted between the transverse flat bars 62, also at spacings of about 16 to 24 inches. The longitudinal flat bars 64 are precisely cut at a right angle, and are precisely fitted between the transverse flat bars 62. The longitudinal flat bars 64 are held to the transverse flat bars 62 by means of angle joiners 66 and rivets 68. The preferred flat bar dimensions for both the longitudinal flat bars 64 and the traverse flat bars 62 are 2.5 inch high by ¼ inch thick. The preferred angle size for the angle joiners 66 is 2.5 inch by 2.5 inch by ¼ inch thick. The preferred material of construction of all structural members, sheets and top plate of the bed extension deck and ramp assembly is aluminum.

It will be appreciated that the longitudinal flat bars 64 and angle joiners 66 prevent the transverse flat bars 62 from canting under load, thereby maintaining their full strength despite sagging of the top plate 52.

Another important feature in the preferred bed extension deck 22 is that the top plate 52 is fastened to the array of flat bars 60 by means of rivets (not shown) and angle clips 70 that are affixed exclusively to the longitudinal flat bars 64. The reason for the mounting of the angle clips 70 to the longitudinal flat bars 64 is to further prevent the canting of the transverse flat bars 62 when the top plate 52 is sagging under load.

Although the structural frame system 60 of the bed extension deck 22 has been described herein, the structure of the ramp member 32 is built in a similar manner as the bed extension deck 22 and therefore, the advantages described herein-above also apply to the ramp member 32.

Figure 7:
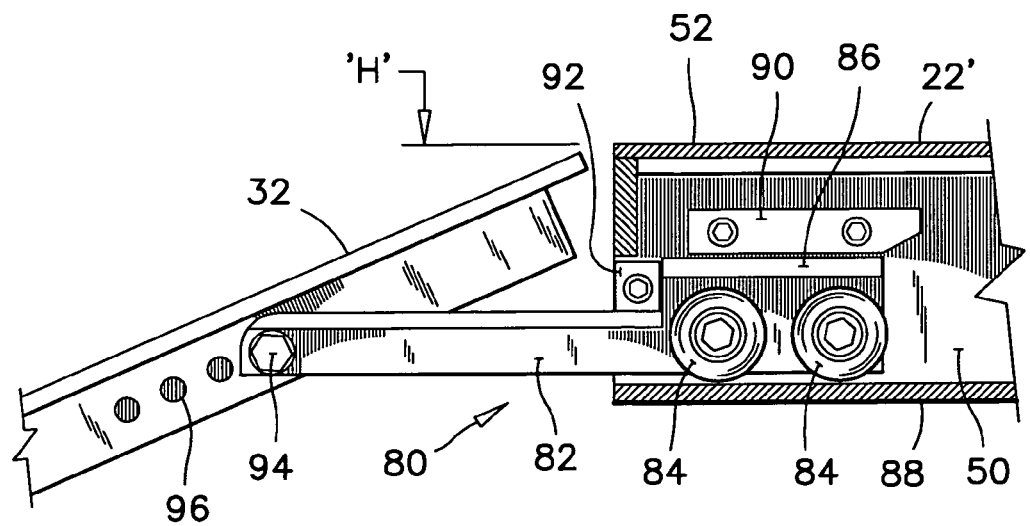
FIG. 7 is a cross-section side view through the preferred extension deck illustrating the position of the ramp member relative to its dolly and pivot assembly when the ramp member is deployed for use.
Figure 8:
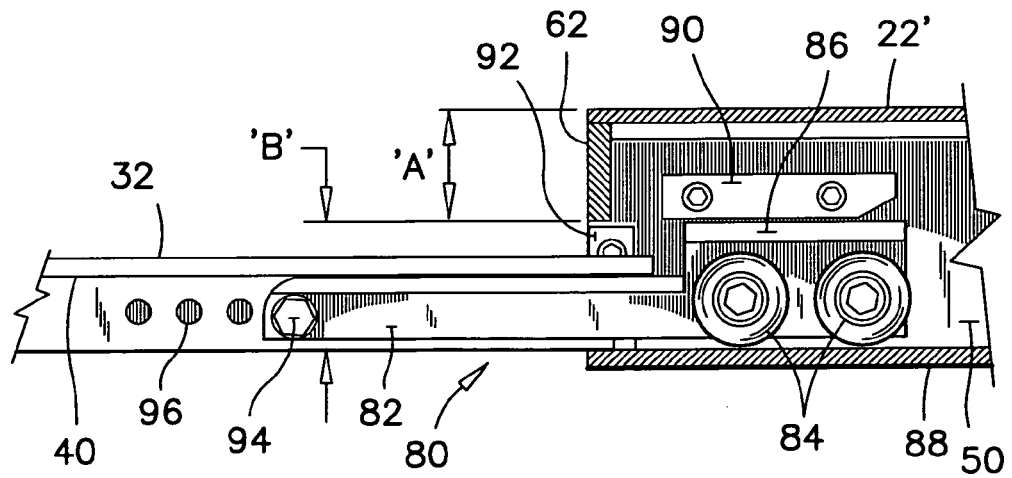
FIG. 8 is a side view through the bed extension deck illustrating the ramp member in a horizontal alignment ready to be stowed inside the preferred bed extension deck.

The forward end of the ramp member 32 has a dolly 80 mounted to each side thereof; only one side is visible in FIGS. 7 and 8. Although only one dolly is visible, it is believed that the person skilled in the art will understand the structure, mounting and operation of these dollies from the following description.

The views in FIGS. 7 and 8 is a longitudinal cross-section view through the flanges of the near side channel 50. The dollies 80 are rolling along the bottom flanges of these channels 50 and are guided sideways against the web of these channels.

For reference purposes, the frame portion 60 of the bed extension deck 22 is represented by the dimension 'A' and the ramp storage compartment under the frame portion, is represented by dimension 'B' as seen in FIG. 8.

The front end of the ramp member 32 has two arms 82 pivoted to a respective side thereof. These arms 82 are part of the dollies 80 mentioned before. These arms 82 are made of structural angles for example. Each arm 82 extends forward inside the rear end of the bed extension deck 22, into the ramp storage compartment 'B'. Each arm 82 has a pair of closely-spaced in-line casters 84 mounted to its forward end, and a cap plate 86 extending above the casters 84. The casters 84 have a larger diameter than a height of the structural angle of the arms 82. The casters 84 on one arm 82 are aligned with the lower flange 88 of a respective structural channel 50 enclosing a respective side of the bed extension deck 22. The dollies 80 guide the ramp member inside the bed extension deck 22, and for support the front end of the ramp member 32 inside the bed extension deck 22.

There are provided inside the side channels 50, a pair of horizontal guide blocks 90 affixed to the web of the channels 50 at the rear end of the channels. These horizontal guide blocks 90 are mounted in a parallel relationship with the lower flange 88 of a respective channel 50.

The clearance between these horizontal guide blocks 90 and the lower flanges 88 of the channel 50 is basically the same as a distance between the lower segment of the casters 84 and the cap plate 86 of each arm 82 plus a free sliding fit. Each dolly 80 is thereby movable in a precisely fitted manner inside a gap between a respective guide block 90 and a flange 88, at the end of its rearward travel.

A stopper block 92 is mounted vertically to the web of each of the side channels 50 at the rear end of the ramp storage compartment 'B'. These stopper blocks 92 are used to prevent the dollies 82 from sliding out of the ramp storage compartment 'B'. In use, the cap plate 86 and/or the rear caster 84 of a dolly abuts against a stopper blocks 92 on the rear end of the channels 50 so as to retain both dollies 80 captive inside the bed extension deck 22.

The guide block 90 and the stopper block 92 shown in FIGS. 7 and 8 are those mounted to the far side channel 50, while the casters 84 are those facing the near side channel 50, on the near side dolly 80. The drawing has been prepared in this manner for convenience to better explain the operation of the dollies 80.

It will be understood that when the ramp 24 is fully deployed, each dolly 80 is held fix between the lower flange 88, the stopper block 92 and the guide block 90, with the arms 82 extending rigidly, parallel with the floor of the bed extension deck 22. A cross-member (not shown) may be provided across the bed extension deck 22 between the dollies 80 to add stability to these dollies 30.

Because of the arm 82 extending rigidly rearward on each dolly 80, the ramp member 32 is pivoted at a distance from its front end. When the ramp member is lowered to the ground, as illustrated in FIGS. 2 and 7, the front end of the ramp member 32 extends higher than the arms 82 to reach a same height 'H' as the floor surface 52 of the bed extension deck 22.

The pivot points 94 on the arms 82 and ramp member 32 can be relocated to other pivot holes 96 along the sides of the ramp member 32 to accommodate different heights of pickup truck bed, so that the ramp's front end, in use, is of a same height 'H' as the floor surface of the bed extension deck 22. This feature is advantageous for driving a vehicle over the ramp member 32 and the bed extension deck 22 without encountering a transition step at the intersection of both elements.

Because each dolly 80 has closely spaced casters 84, the arms 82 of these dollies 80 are stable and rigidly held to resist downward forces when the ramp is used normally. The arms 82 of these dollies 80 are also stable and rigidly held to resist upward forces when a vehicle climbs the ramp with substantial momentum. For reference purposes, the spacing between the casters 84 is about 1.5 to twice the diameter of one caster.

For reference purposes, the bed extension deck 22 may have overall dimensions of 48 inch wide by 96 inch long when unfolded. The ramp member 32 with its dollies may have dimensions of 47-¾ inch wide by 95-½ inch long. The deployed ramp member 32 has a slope of about 23 degrees, when used on horizontal grounds.

Figure 9:
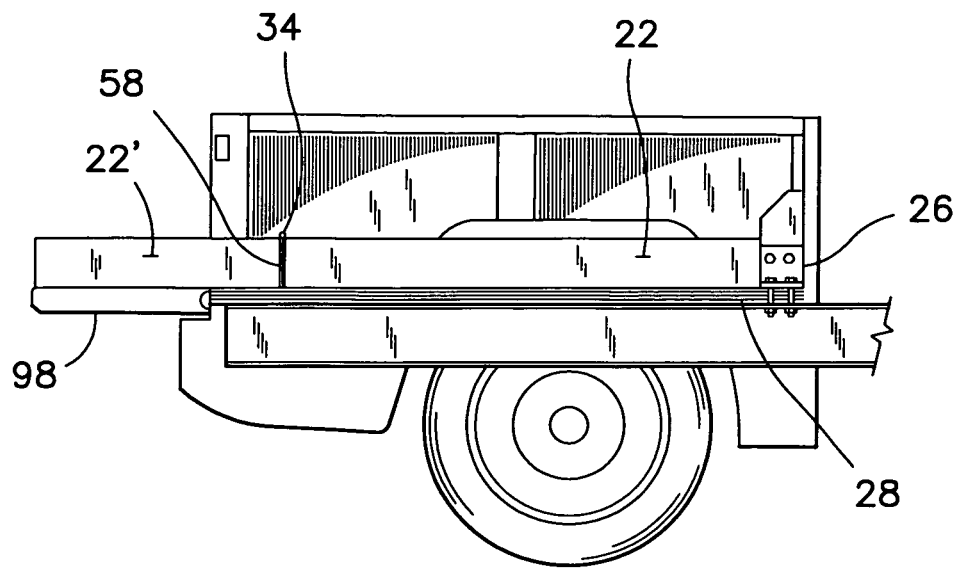
FIG. 9 is an enlarged cross-section side view of a short box of a pickup truck with the preferred bed extension deck mounted therein and illustrated in a deployed mode.
Figure 10:
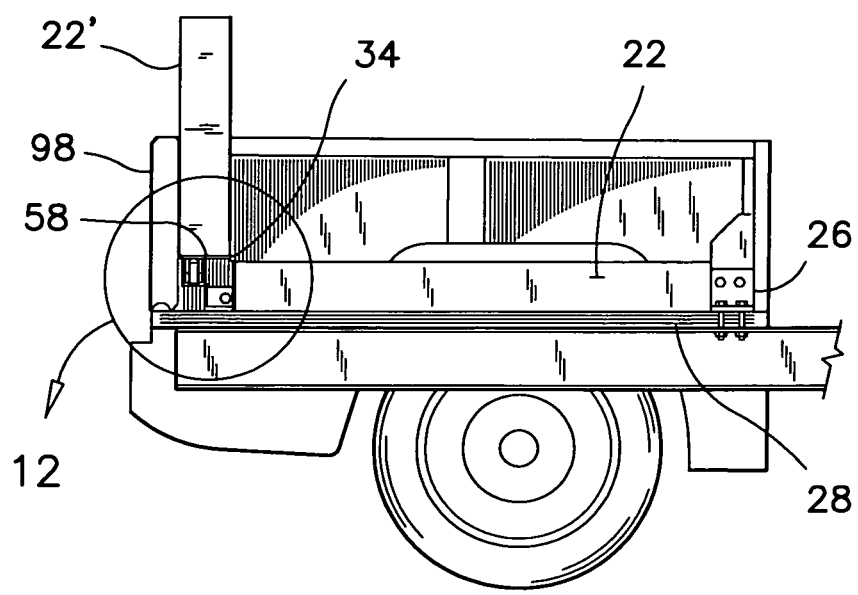
FIG. 10 is another enlarged cross-section side view of a short box of a pickup truck with the preferred bed extension deck and ramp assembly mounted therein and shown in a folded stowed position.

Referring now to FIGS. 9 and 10, the folding of the bed extension deck will be described. As mentioned before, the preferred bed extension deck 22 has a separation 58 therein and a foldable rear portion 22'. The rear portion 22' is foldable on the piano-type hinge 34 from a flat position over the tailgate 98, to a vertical position inside the tailgate 98 of a short box pickup truck.

When the foldable segment 22' of the bed extension deck 22 is in a flat position as shown in FIG. 9, the space available over the deck 22 is substantially the same as inside a full-length box of a conventional pickup truck. The truck can be used with the tailgate 98 open to carry common building materials and other equipment that is best transported in a conventional pickup truck.

When the foldable segment 22' of the bed extension deck is in a folded position as shown in FIG. 10, the bed extension deck 22 and ramp member 32 do not prevent the tailgate 98 of a short box pickup truck from being closed as if nothing was mounted in the truck box 24.

Figure 11:
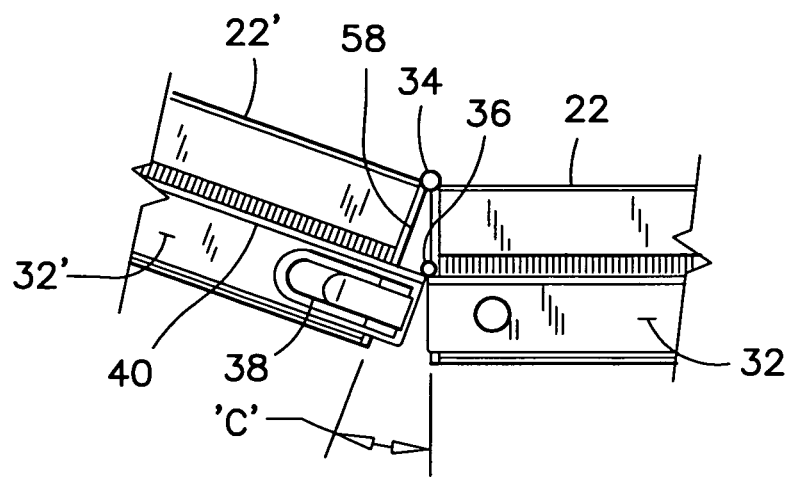
FIG. 11 is an enlarged view of the detail circle 12 in FIG. 10, showing the preferred extension deck and ramp assembly in an intermediate position during folding.
Figure 12:
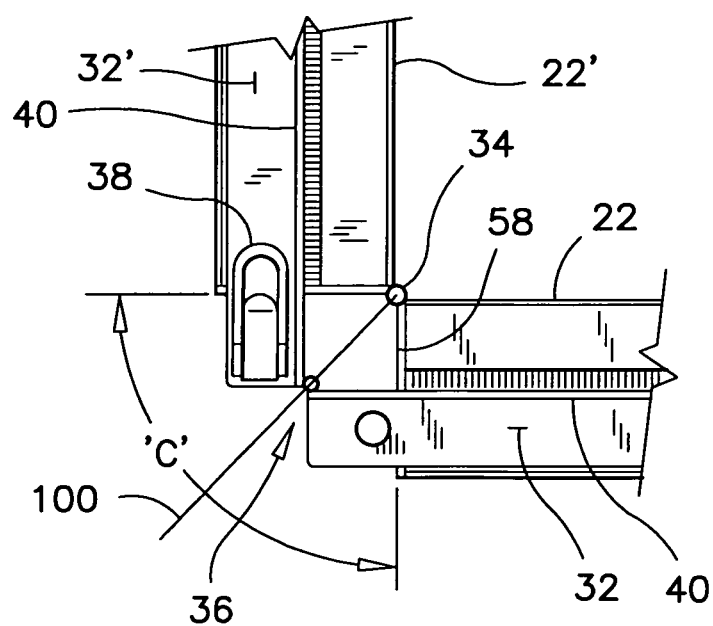
FIG. 12 is another enlarged view of the detail circle 12 in FIG. 10, showing the preferred extension deck and ramp assembly in the folded or stowed position.

Referring to FIGS. 11 and 12, cross-section views of the bed extension deck 22 during folding are illustrated. Firstly, the latches 38 on both sides of the ramp member 32 are unlocked and tucked under the shoulders 40 along the edges of the ramp member 32 before the ramp member 32 is inserted fully inside the storage compartment 'B' of the extension deck 22.

The ramp member 32 is stowed inside the storage compartment 'B' so that the second hinge 36 is vertically inline or slightly rearward relative to the first hinge 34 as illustrated in FIG. 11.

The tilting upward of the foldable segment 22' of the bed extension deck causes the ramp member 32 to move backward, and causes the foldable ramp portion 32' to move forward and downward such that the second hinge 36 is automatically pulled forward or backward to lie in a position near to or on a median 100 of the angle of displacement 'C' of the foldable segment 22' of the bed extension deck.

The ramp storage compartment 'B' together with its channels 50 and the ramp's dollies 80 jointly constitute a guiding arrangement for maintaining the ramp member 32 in a parallel alignment with the bed extension deck. Because of this guiding arrangement, the ramp member is easily adjustable inside the storage compartment 'B' for maintaining the second hinge 36 in alignment with the median line 100. The bed extension deck 22 with the ramp member 32 stowed therein are easily foldable by hand.

When the bed extension deck 22 is in its folded position, as shown in FIG. 12 the tailgate 98 of the pickup truck can be closed to retain the bed extension deck 22 in that folded position. Springs and shock absorbers can also be used to assist in the working of the bed extension deck between a deployed and a folded positions.

When the bed extension deck is folded back to a flat alignment, the ramp member 32 returns to its initial position inside the storage compartment 'B', and can be withdrawn for normal use.

Although the bed extension deck 22 and ramp member 32 are described herein as accessories for a pickup truck, it will be appreciated that this invention can also be used in other environments including loading docks, trailers, cargo vans, etc.

What is claimed is:

1. A truck bed extension deck having a top plate, a structural frame system mounted under said top plate and a ramp storage compartment positioned under said structural frame system, said structural frame system comprising:
   a longitudinal channel on each side thereof;
   transverse flat bars extending transversely between said longitudinal channels;
   longitudinal flat bars extending longitudinally between said transverse flat bars;
   angle joiners and fasteners retaining each end of one of said longitudinal flat bars to one of said transverse flat bars; and
   angle clips affixed exclusively to said longitudinal flat bars and to said top plate for retaining said top plate to said structural frame system
   said structural frame system further having unattached connections between said top plate and said transverse flat bars such that an alignment of said transverse flat bars remains unaffected by a sagging of said top plate under load.

2. The truck bed extension deck as claimed in claim 1, also having a ramp member telescopically mounted in said ramp storage compartment.

3. The truck bed extension deck as claimed in claim 2, wherein said structural frame system and said ramp members are made of aluminum.

4. A truck bed extension deck having a ramp member telescopically mounted inside said bed extension deck;
   said bed extension deck having a front segment and a rear segment; said rear segment being joined to said front segment by a first hinge such that said rear segment being foldable upwardly relative to said front segment;
   said ramp member having a front portion and a rear portion; said rear portion being joined to said front portion by a second hinge such that said rear portion being foldable upwardly relative to said front portion;
   said first hinge having an angle of articulation, and said second hinge being located within said angle of articulation when said ramp member is stowed inside said bed extension deck;
   said bed extension deck further having a framing system therein and a ramp storage compartment under said framing system; said ramp member being telescopically mounted in said ramp storage compartment; and said framing system comprising transverse flat bars extending there across; longitudinal flat bars extending across said transverse flat bars, and a top plate covering said longitudinal flat bars and said transverse flat bars and being affixed exclusively to said longitudinal flat bars;

said framing system further having unattached connections between said top plate and said transverse flat bars such that an alignment of said transverse flat bars remains unaffected by a sagging of said top plate under load.

* * * * *